(12) United States Patent
Yu (10) Patent No.: US 6,529,393 B1
(45) Date of Patent: Mar. 4, 2003

(54) PHASE CURRENT SENSOR USING INVERTER LEG SHUNT RESISTOR

(75) Inventor: Zhenyu Yu, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/708,377

(22) Filed: Nov. 9, 2000

Related U.S. Application Data (60) Provisional application No. 60/168,322, filed on Dec. 1, 1999.

(51) Int. Cl.$^7$ .............................. H02M 1/12; H02M 7/48
(52) U.S. Cl. ......................................... 363/41; 318/811
(58) Field of Search .............................. 363/41, 40, 39, 363/98, 132, 43; 318/802, 803, 811, 812

(56) References Cited

U.S. PATENT DOCUMENTS

| | | | |
|---|---|---|---|
| 4,772,996 A | * 9/1988 | Hanei et al. | ................... 363/41 |
| 5,308,349 A | * 5/1994 | Kwan | ......................... 363/98 |
| 5,517,095 A | 5/1996 | Carobolante et al. | |
| 5,706,186 A | * 1/1998 | Blasko | ......................... 363/41 |
| 5,789,895 A | 8/1998 | Lee | |

* cited by examiner

Primary Examiner—Rajnikant B. Patel
(74) Attorney, Agent, or Firm—J. Dennis Moore; W. James Brady, III; Frederick J. Telecky, Jr.

(57) ABSTRACT

In a pulse width modulation controlled three-phase voltage-source inverter having three legs, each leg including two transistors coupled serially between the terminals of a power source and providing a respective drive output, each leg further including a shunt resistor between one of the two transistors and one of the terminals, in which control pulses are applied to each leg during a sequence of pulse periods, and the inverter has a neutral current, a method for determining the phase current for each phase. The method includes the following steps. First, it is determined which two legs have the longest on time for the lower power transistors. The current through the shunt resistors for the determined legs is determined, to obtain a value representative of the phase current for the legs. Finally, the phase current for the leg not sampled during the sector is derived by subtracting the determined phase currents from the neutral current.

5 Claims, 5 Drawing Sheets

FIG. 6c $U_{OUT}$ IN SECTOR OF $U_{120}-U_{180}$

FIG. 6d $U_{OUT}$ IN SECTOR OF $U_{180}-U_{240}$

FIG. 6e $U_{OUT}$ IN SECTOR OF $U_{240}-U_{300}$

FIG. 6f $U_{OUT}$ IN SECTOR OF $U_{300}-U_0$

PHASE CURRENT SENSOR USING INVERTER LEG SHUNT RESISTOR

This application claims priority under 35 U.S.C. §119(e)(1) of provisional application No. 60/168,322 filed Dec. 1, 1999.

TECHNICAL FIELD OF THE INVENTION

This invention relates to three-phase voltage-source inverters, and more particularly relates to a method and apparatus for sensing phase current with shunt resistors on inverter legs.

BACKGROUND OF THE INVENTION

Pulse width modulation (PWM) techniques are used to control three-phase (3φ) voltage-source inverters (VSI), in applications such as control of DC brushless, AC induction motors, permanent-magnet synchronous motors, and other 3φ loads. For example, PWM inverters make it possible to control both the frequency and magnitude of the voltage and current applied to a motor. As a result, PWM inverter-powered motor drives offer better efficiency and higher performance compared to fixed frequency motor drives. The energy that a PWM inverter delivers to a load is controlled by PWM signals applied to the gate or base of the power transistors.

Several PWM techniques are known and used in the art, for determining the modulating signal and the switch-on/switch-off instants from the modulating signal. Currently popular examples are sinusoidal PWM, hysteric PWM, and space-vector (SV) PWM. These techniques are commonly used for control of AC induction, BLDC and switched reluctance (SR) motors.

Figure 1:
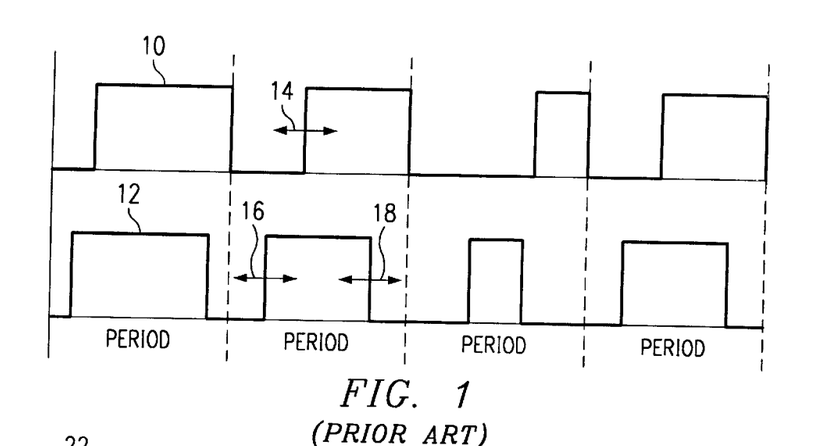
FIG. 1 is a signal diagram showing symmetric and asymmetric pulses for a prior art pulse width modulation scheme.

PWM can be either symmetric, or asymmetric, as shown in FIG. 1. In FIG. 1 two pulse waveforms 10 and 12, are shown for four contiguous, equal periods. The top waveform 10 in the figure is an example of an asymmetric PWM, in which the timing for the leading edge in each period varies, as shown by arrow 14, while the trailing edge always coincides with the end of the period. The bottom waveform 12 in the figure is an example of a symmetric PWM, in which the timing for both the leading edge and the trailing edge is varied by the same amount in opposite directions, as shown by arrows 16 and 18, respectively, resulting in symmetry for the waveform in every period.

Figure 2:
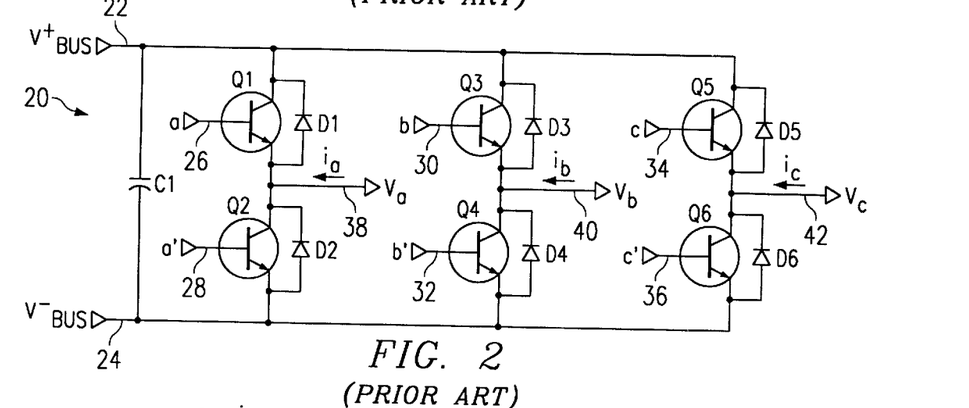
FIG. 2 is a circuit diagram of a typical prior art 3φ VSI.

A circuit diagram of a typical 3φ VSI 20 is shown in FIG. 2. A DC voltage, $V_{DC}$, is provided between a $V^+_{BUS}$ 22 and a $V^-_{BUS}$ 24. Three legs are connected between bus 22 and bus 24. The first leg includes a power transistor Q1 having its collector connected to bus 22, and a power transistor Q2 having its collector connected to the emitter of transistor Q1 and having its emitter connected to bus 24. A diode D1 is connected between the emitter and collector of transistor Q1, and a diode D2 is connected between the emitter and collector of transistor Q2. In both cases the cathode of the diode is connected to the collector of the transistor. A control signal a is provided on line 26 to the base of transistor Q1, while a control signal a' is provided on line 28 to the base of transistor Q2. The common connection point of transistors Q1 and Q2 is connected to line 38, which carries the output voltage $V_a$ and phase a current $i_a$ of the first leg.

The other two legs are of the same structure as the first leg. Thus, the second leg includes a power transistor Q3 having its collector connected to bus 22, and a power transistor Q4 having its collector connected to the emitter of transistor Q3 and having its emitter connected to bus 24. A diode D3 is connected between the emitter and collector of transistor Q3, and a diode D4 is connected between the emitter and collector of transistor Q4. In both cases the cathode of the diode is connected to the collector of the transistor. A control signal b is provided on line 30 to the base of transistor Q3, while a control signal b' is provided on line 32 to the base of transistor Q4. The common connection point of transistors Q3 and Q4 is connected to line 40, which carries the output voltage $V_b$ and phase b current $i_b$ of the second leg.

Similarly, the third leg includes a power transistor Q5 having its collector connected to bus 22, and a power transistor Q6 having its collector connected to the emitter of transistor Q5 and having its emitter connected to bus 24. A diode D5 is connected between the emitter and collector of transistor Q5, and a diode D6 is connected between the emitter and collector of transistor Q6. In both cases the cathode of the diode is connected to the collector of the transistor. A control signal c is provided on line 34 to the base of transistor Q5, while a control signal c' is provided on line 36 to the base of transistor Q6. The common connection point of transistors Q5 and Q6 is connected to line 42, which carries the output voltage $V_c$ and phase c current $i_c$ of the third leg.

In operation, when an upper transistor, Q1, Q3 or Q5, is turned on, i.e., when a, b or c is 1, the corresponding lower transistor, Q2, Q4, or Q5, is switched off, i.e., the corresponding a', b' or c' is 0. The on and off states of the upper transistors are sufficient to evaluate the output voltage for the purposes of this discussion. The relationship between the switching variable vector [a, b, c], the line-to-line output voltage vector $[V_{ab}\ V_{bc}\ V_{ca}]$ and the phase (line-to-neutral) output voltage vector $[V_{an}\ V_{bn}\ V_{cn}]$, for a balanced load, is given by the following equations:

$$\begin{bmatrix} V_{ab} \\ V_{bc} \\ V_{ca} \end{bmatrix} = \begin{bmatrix} 1 & -1 & 0 \\ 0 & 1 & -1 \\ -1 & 0 & 1 \end{bmatrix} \begin{bmatrix} a \\ b \\ c \end{bmatrix} \quad \text{Equation (1)}$$

$$\begin{bmatrix} V_{bn} \\ V_{bn} \\ V_{cn} \end{bmatrix} = \begin{bmatrix} 2 & -1 & -1 \\ -1 & 2 & -1 \\ -1 & -1 & 2 \end{bmatrix} \begin{bmatrix} a \\ b \\ c \end{bmatrix} \quad \text{Equation (2)}$$

where $V_{DC}$ is the DC supply voltage, or the bus voltage.

There are eight possible combinations of on and off states for the three upper power transistors. The eight combinations and the derived output line-to-line and phase voltages in terms of DC supply voltage $V_{DC}$, according to Equation (1) and Equation (2), are shown in Table 1:

TABLE 1

| a | b | c | $V_{an}$ | $V_{bn}$ | $V_{cn}$ | $V_{ab}$ | $V_{bc}$ | $V_{ca}$ |
|---|---|---|---|---|---|---|---|---|
| 0 | 0 | 0 | 0 | 0 | 0 | 0 | 0 | 0 |
| 1 | 0 | 0 | 2/3 | -1/3 | -1/3 | 1 | 0 | -1 |
| 1 | 1 | 0 | 1/3 | 1/3 | -2/3 | 0 | 1 | -1 |
| 0 | 1 | 0 | -1/3 | 2/3 | -1/3 | -1 | 1 | 0 |
| 0 | 1 | 1 | -2/3 | 1/3 | 1/3 | -1 | 0 | 1 |
| 0 | 0 | 1 | -1/3 | -1/3 | 2/3 | 0 | -1 | 1 |
| 1 | 0 | 1 | 1/3 | -2/3 | 1/3 | 1 | -1 | 0 |
| 1 | 1 | 1 | 0 | 0 | 0 | 0 | 0 | 0 |

Assume d and q are the fixed horizontal and vertical axes in the plane of the three motor phases. The vector representations of the phase voltage corresponding to the eight combinations can be obtained by applying the following so-called d-q transformation to the phase voltages:

$$T_{abc-dq} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \quad \text{Equation (3)}$$

Figure 3:
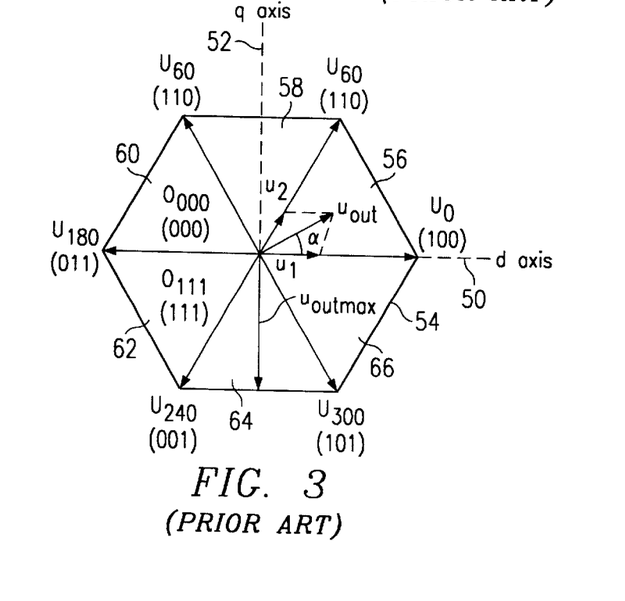
FIG. 3 is a diagram of a space vector coordinate system.

This transformation is equivalent to an orthogonal projection of [a,b,c] onto the two dimensional plane having perpendicular axes d axis 50 and q axis 52, perpendicular to the vector [1,1,1] in a three-dimensional coordinate system, the results of which are six non-zero vectors and two zero vectors as shown in FIG. 3. The six non-zero vectors form the axes of a hexagonal 54 having six sectors 56, 58, 60, 62, 64 and 66, each bounded by two of the non-zero vectors. The angle between any adjacent two non-zero vectors is 60 degrees. The zero vectors are at the origin of axes 50, 52, and apply zero voltage to the three-phase load. The eight vectors are called the basic space vectors and are denoted in FIG. 3 by $U_0$, $U_{60}$, $U_{120}$, $U_{180}$, $U_{240}$, $U_{300}$, $O_{000}$, and $O_{111}$.

The same d-q transformation can be applied to a desired three-phase voltage output to obtain a desired reference voltage vector $u_{out}$ in the d-q plane as shown in FIG. 3. In general, the vector $u_{out}$ has a magnitude of $\|u_{out}\|$ and an angle of $\alpha$ with respect to one of the two basic vectors forming the sector that contains $u_{out}$ in an instant of time. Being in the sector 56 bounded by space vectors $U_0$ and $U_{60}$, the particular vector $u_{out}$ shown in FIG. 3 may be expressed as the vector sum of two vector components $u_1$ and $u_2$, having the same angle as space vectors $U_0$ and $U_{60}$, respectively. Note that the magnitude of $u_{out}$ is the root mean square (rms) value of the corresponding line-to-line voltage with the defined d-q transform. Note also that the maximum magnitude for $u_{out}$, shown in FIG. 3 as $u_{outmax}$, can be derived to be $$\frac{V_{DC}}{\sqrt{2}}.$$

In operating a 3φ VSI such as 3φ VSI 20 of FIG. 1, it is important to control the phase currents $i_a$, $i_b$ and $i_c$, so as to control, e.g., the torque and speed of a motor load. The objective of the present invention is low cost monitoring of this "phase current."

The easiest way in which to monitor phase current is with a transformer coupled circuit. A hall effect sensor is typically used when this type of monitoring is chosen. However, such monitors are costly, requiring typically a transformer and separate integrated circuit. In addition, the signal output of such monitors requires a linear amplifier, which adds design complexity and further cost.

Figure 4:
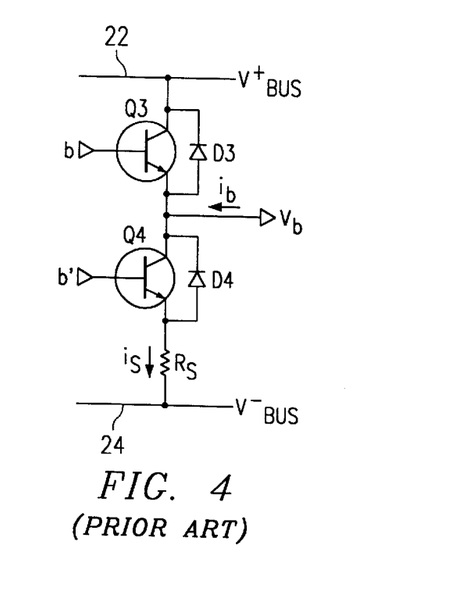
FIG. 4 is a diagram of a leg of the 3φ VSI FIG. 2.

Another approach uses a so-called shunt resistor. An example of this is shown in FIG. 4, which is a diagram of the second, Q3, Q4 leg of the 3φ VSI 20 of FIG. 2, having the shunt resistor $R_S$, connected between the emitter of transistor Q4 and $V^-_{BUS}$ 24. Each of the three legs is provided with such a resistor. In using this technique the voltage $v_S$ across $R_S$ is measured when transistor Q4 is on, and Ohms Law applied to derive the current $i_S$, or phase current $i_b$, through resistor $R_S$. Now, the duty cycle of the particular leg determines the amount of time that the lower transistor in that leg, e.g., transistor Q4, is on. Ignoring dead band effects, if the duty cycle of a leg is dcy, expressed as a decimal quantity with a 0% duty cycle being represented as 0 and a 100% duty cycle being represented as 1.0, and the PWM period being represented as $T_{PWM}$, then the upper transistor is on dcy* $T_{PMW}$, and the lower transistor is on (1–dcy)* $T_{PWM}$.

It is necessary for the width of the lower leg pulse, or, sampling interval, to be sufficiently long to have a "good" sample to measure. This is because reactive components at the base of the lower leg transistor will subject the voltage at that node to a time constant factor, delaying the achievement of the full voltage, causing ringing, and the like. The so-called dead band included to prevent shoot through fault also reduces the effective sampling interval. Thus, the pulse width must be sufficiently long to take into account the dead band and still allow the measured voltage to settle, and thus correspond to the true phase current.

One prior art approach to dealing with this problem has been to "over-design" the inverter, so that the on time for the lower transistor e.g., transistor Q4, is never smaller than a lower bound. In other words, the inverter components are designed to provide a high enough voltage so that the upper transistor in any leg is never on for such a high portion of a PWM period that the lower transistor is on for such a short time that a good sample of the voltage $v_S$ cannot be taken.

Still, it is desired to have a lower cost solution to providing an accurate phase current monitor for a 3φ VSI, while not requiring, e.g., over-design of the inverter. The present invention provides such a lower cost solution.

SUMMARY OF THE INVENTION

The present invention provides, in a pulse width modulation controlled three-phase voltage-source inverter having three legs, each leg including two transistors coupled serially between the terminals of a power source and providing a respective drive output, each leg further including a shunt resistor between one of the two transistors and one of the terminals, in which control pulses are applied to each leg during a sequence of pulse periods, and the inverter has a neutral current, a method for determining the phase current for each leg. The method includes the following steps. First, it is determined which two legs have the longest on time for the lower power transistors. The current through the shunt resistors for the determined legs is determined, to obtain a value representative of the phase current for the legs. Finally, the phase current for the leg not sampled during the sector is derived by subtracting the determined phase currents from the neutral current.

These and other features of the invention will be apparent to those skilled in the art from the following detailed description of the invention, taken together with the accompanying drawings.

BRIEF DESCRIPTION OF THE DRAWINGS

FIGS. 6(*a*)–6(*f*) are illustrations of certain SVPWM waveform patterns for a full fundamental electrical period in each of the six sectors shown in FIG. 3.

FIGS. 8(*a*)–(*d*) are diagrams showing the patterns of applied control voltage a, b and c, in a full fundamental electrical period of the SVPWM technique discussed here.

DETAILED DESCRIPTION OF THE PREFERRED EMBODIMENTS

Figure 5:
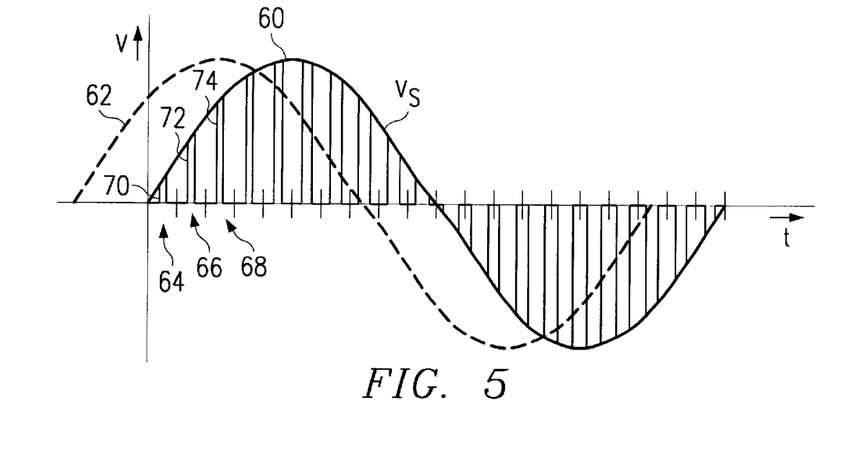
FIG. 5 is a signal diagram showing a plot of phase current over time for a leg of a 3φ VSI.

FIG. 5 is a signal diagram showing a plot 60 of $i_S$, which corresponds to phase current as described hereinabove, over time for a leg of a 3φ VSI. Superimposed on the diagram is a plot 62 of the inverter output voltage for the same leg. The horizontal axis represents time, while the vertical axis represents voltage or current, depending on the plot. Note the phase shift of plot 60 with respect to plot 62 due to the load reactance. The horizontal axis is divided into equal duration periods 64, 66, 68, etc., which represent the PWM periods.

The $i_S$ plot 60 is divided into pulses 70, 72, 74, etc., which correspond to the PWM pulses actually generated by the lower transistor of the leg. The widths of the pulses 70, 72, 74, etc., vary in accordance with the principles described above, being narrowest (i.e., shortest) at the positive peak of the inverter output voltage 62, and being widest (i.e., longest) at the negative peak of the inverter output voltage 62, as can be seen in the figure. The problem solved by the present invention is the avoidance of inaccurate determination of the voltage during any of the pulses 70, 72, 74, etc., even when such pulses are very short, due to a high duty cycle for that PWM period (upper transistor is on for a long time, lower transistor is on for a short time).

In accordance with the preferred embodiment of the present invention for each PWM period it is determined which two inverter legs are the ones that have the smallest duty cycles. The shunt voltage $v_S$ for those two legs is measured, their shunt current $i_S$, i.e., their phase current, determined, and then the phase current of the third leg is derived from those two determined shunt currents. Once the phase currents of the two longest duty cycle legs are determined, the derivation of the phase current of the other leg is simple. This is because the phase currents of the three legs add up to whatever the neutral current is at any given point in time. Provided that the 3φ load is of Delta configuration or Y configuration with floating neutral, that neutral current is simply zero, so the three phase currents add up to zero. In the case of a Y configuration with non-floating neutral, the neutral current can be monitored using known techniques. In such case, the phase currents of the three legs add up to whatever the neutral current is determined to be, at any given point in time.

The preferred embodiment is applied in a system using a SVPWM control method. In applying the method it is first determined which two legs have the smallest duty cycles in each of the six sectors 56, 58, 60, 62, 64 and 66, of the space vector coordinate system shown in FIG. 3. The SVPWM method gives the values $\|u_{out}\|$, α, and the sector $u_{out}$ is in. From those values, the magnitudes of the vector components $u_1$ and $u_2$ can be derived:

$$\|u_1\| = \frac{2}{\sqrt{3}} \|u_{out}\| \cos(\alpha + 30°) \qquad \text{Equation (4)}$$

$$\|u_2\| = \frac{2}{\sqrt{3}} \|u_{out}\| \sin(60° - \alpha) \qquad \text{Equation (5)}$$

$$= \frac{2}{\sqrt{3}} \|u_{out}\| \sin(\alpha)$$

These magnitudes need to be converted to time. This involves a conversion factor K:

$$t_1 = Ku_1 \qquad \text{Equation (6)}$$

$$t_2 = Ku_2. \qquad \text{Equation (7)}$$

Now, let $$t = t_1 + t_2. \qquad \text{Equation (8)}$$

Solving for K involves substituting Equations (4) and (5) into equations (6) and (7) and solving Equation (8), which yields:

$$t = K \frac{2}{\sqrt{3}} \|u\| \sin(60 + \alpha) \qquad \text{Equation (9)}$$

From FIG. 3, the ranges for $\|u\|$ and α are:

$$\|u\|: 0 \leftrightarrow \frac{V_{DC}}{\sqrt{2}}$$

$$\alpha: 0 \leftrightarrow 60°$$

Therefore, $$T_{PWM} = t_{max} = K \frac{2}{\sqrt{3}} \frac{V_{dc}}{\sqrt{2}} \qquad \text{Equation (10)}$$

Now, $$K = \frac{\sqrt{3}}{\sqrt{2}} \frac{T_{PWM}}{V_{DC}} \qquad \text{Equation (11)}$$

Thus, $$t_1 = \qquad \text{Equation (12)}$$

$$\sqrt{2} \, T_{PWM} \frac{\|u\|}{V_{dc}} \sin(60° - \alpha) = T_{PWM} \frac{\sqrt{2}}{V_{dc}} \|u\| \sin(60° - \alpha)$$

and $$t_2 = \sqrt{2} \, T_{PWM} \frac{\|u\|}{V_{dc}} \sin\alpha = T_{PWM} \frac{\sqrt{2}}{V_{dc}} \|u\| \sin\alpha \qquad \text{Equation (13)}$$

Therefore, $$t_1 + t_2 = T_{PWM} \frac{\sqrt{2}}{V_{dc}} \|u\| \sin(60° + \alpha) \qquad \text{Equation (14)}$$

Let $$t_0 = T_{PWM} - t_1 - t_2 \qquad \text{Equation (15)}$$

Then $$t_0 + t_1 + t_2 = T_{PWM} \qquad \text{Equation (16)}$$

Thus, in order to produce a voltage output represented by $u_{out}$, the inverter must be put in switching states corresponding to the two adjacent basic space vectors for $t_1$, $t_2$, respectively, in the present PWM period, and in a switching state corresponding to $O_{000}$ or $O_{111}$ for the rest of the period.

Figure 6A:
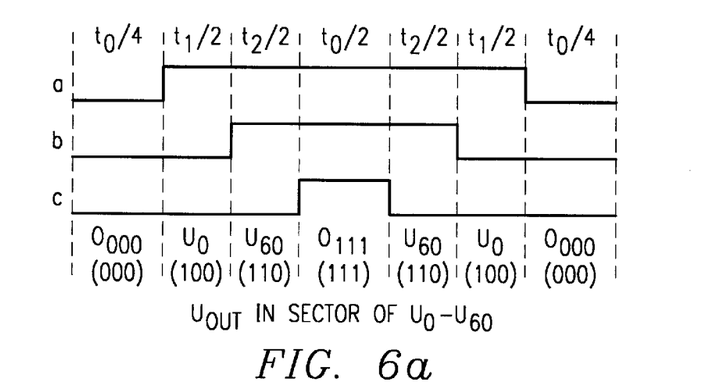
Figure 6B:
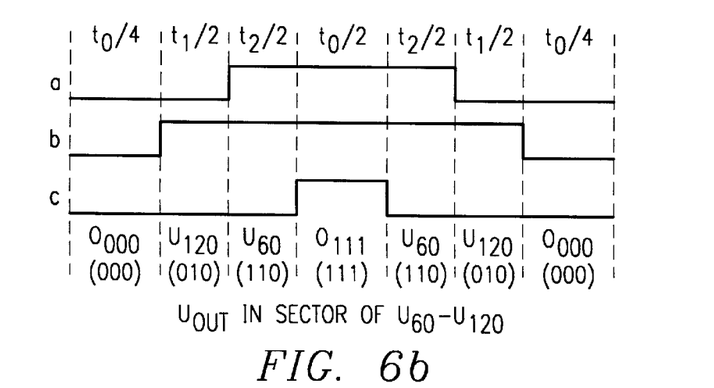
Figure 6C:
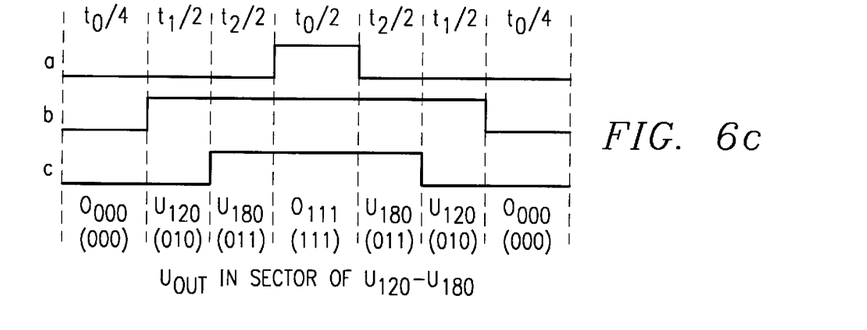
Figure 6D:
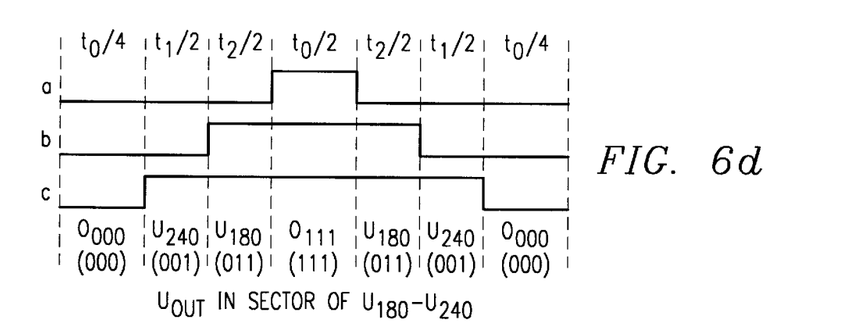
Figure 6E:
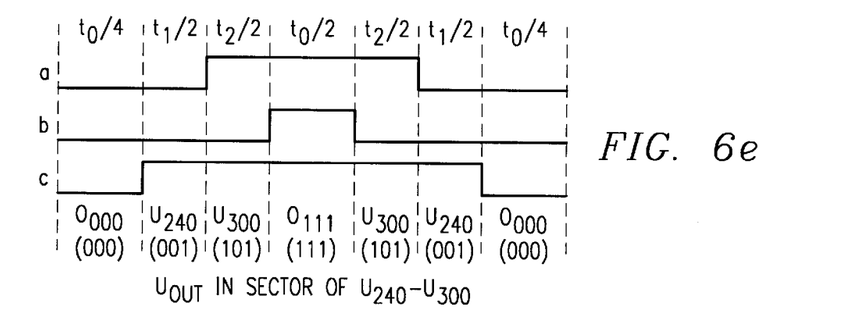
Figure 6F:
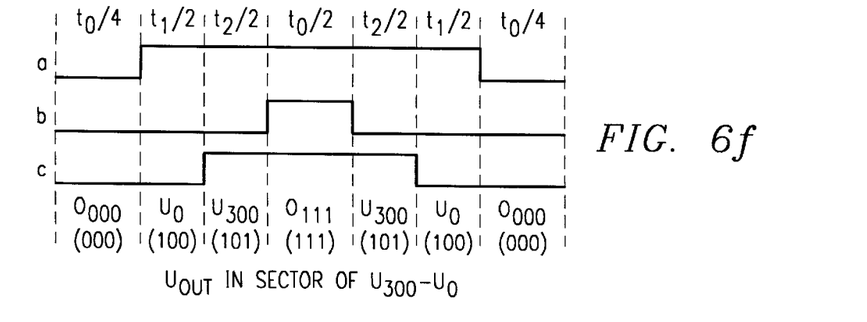

The final waveform pattern is determined by the ordering of these states in a PWM period. The preferred embodiment is applied to a symmetric SVPWM pattern. FIGS. 6(*a*)–6(*f*) are illustrations of the SVPWM waveform patterns for a full fundamental electrical period in each of the six sectors. In each of FIGS. 6(a)–6(f) the horizontal axis represents time and the vertical axis represents voltage. FIG. 6(a) shows the waveforms in sector 56 ($U_0$–$U_{60}$, FIG. 3), FIG. 6(b) shows the waveforms in sector 58 ($U_{60}$–$U_{120}$), FIG. 6(c) shows the waveforms in sector 60 ($U_{120}$–$U_{180}$), FIG. 6(d) shows the waveforms in sector 62 ($U_{180}$–$U_{240}$), FIG. 6(e) shows the waveforms in sector 64 ($U_{240}$–$U_{300}$), while FIG. 6(f) shows the waveforms in sector 66 ($U_{300}$–$U_0$).

Figure 7:
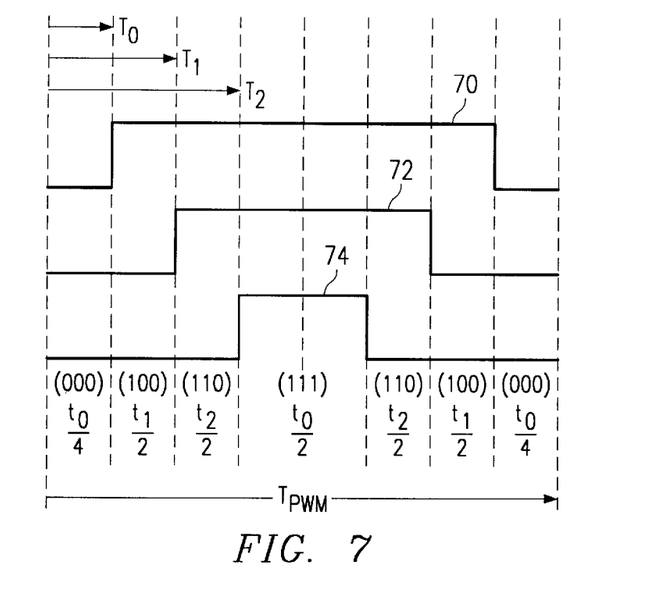
FIG. 7 is a diagram showing the waveform patterns in FIG. 6(*a*), including additional details.

FIG. 7 is a detailed illustration of the waveforms shown in FIG. 6(a). FIG. 7 shows graphs 60, 72 and 74, of the three control signals a, b and c, (FIG. 2), generated in sector 56 ($U_0$–$U_{60}$) in a complete PWM period, $T_{PWM}$. In FIG. 7 it can be seen that the times $t_0$, $t_1$ and $t_2$ are distributed within $T_{PWM}$ as shown in the figure such that the initial interval from the beginning of $T_{PWM}$ to the onset of the first leg pulse is $$\frac{t_0}{4},$$

which is designated $T_0$ and is shown in the figure at the top thereof. The interval from the beginning of $T_{PWM}$ to the onset of the second leg pulse is $$\frac{t_0}{4} + \frac{t_1}{2}$$

which is designated $T_1$ and is shown in the figure at the top thereof. The interval from the beginning of $T_{PWM}$ to the onset of the second leg pulse is $$\frac{t_0}{4} + \frac{t_1}{2} + \frac{t_2}{2}$$

which is designated $T_2$, and is shown in the figure at the top thereof.

Figure 8A:
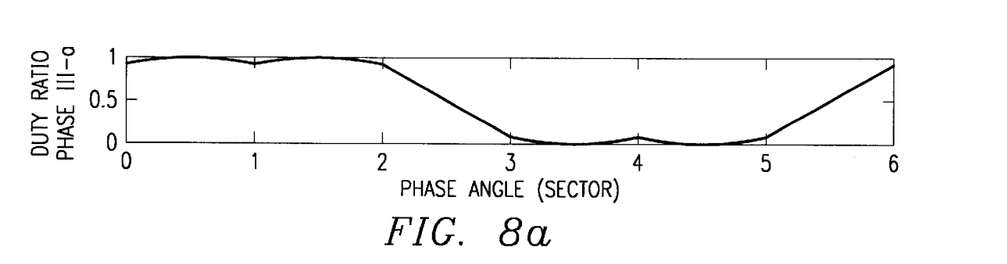
Figure 8B:
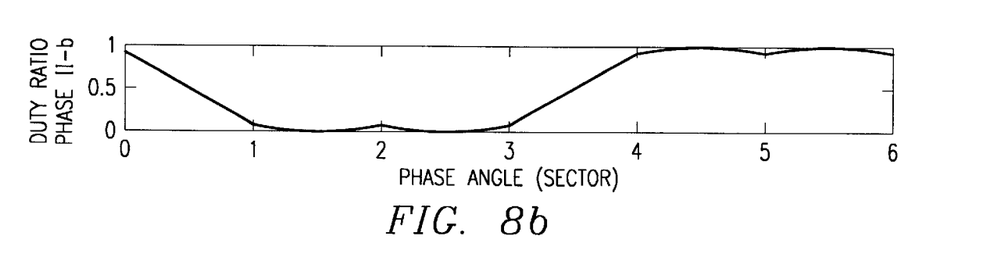
Figure 8C:
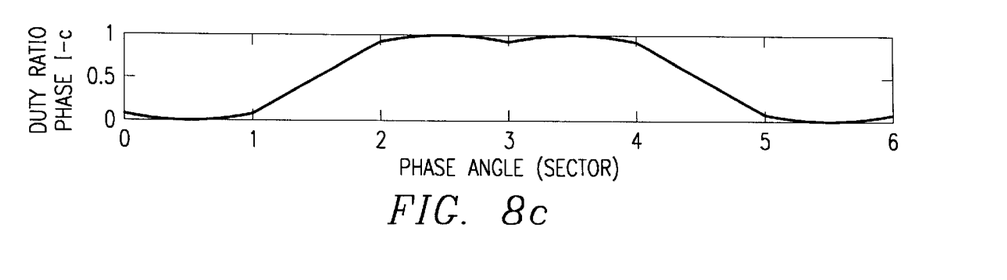
Figure 9:
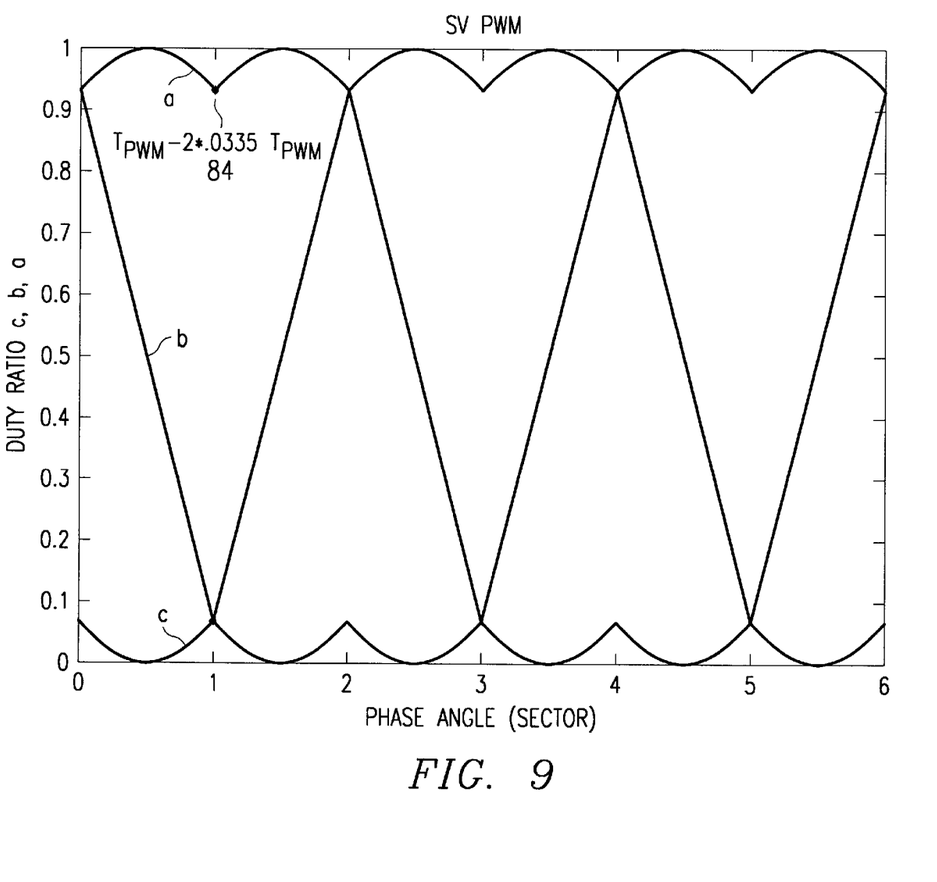
FIG. 9 is a diagram showing the same waveforms a, b and c, shown in FIGS. 8(*a*)–(*d*), superimposed on top of each other.

It is important to note that the sequence of switching on and off among these legs is fixed in each sector. FIGS. 8 and 9, are diagrams of the applied control voltages a, b and c, in which the horizontal axis represents motor phase angle, in sectors, and the vertical axis represents duty cycle, or relative pulse width, which corresponds to voltage. FIG. 8(a) is a diagram of the a, or phase III, control voltage. FIG. 8(b) is a diagram of the b, or phase II, control voltage. FIG. 8(c) is a diagram of the c, or phase I, control voltage. The top of the vertical axis corresponds to a 100% duty cycle; the bottom of the vertical axis corresponds to a 0% duty cycle.

FIG. 9 is a diagram like those of FIGS. 8(a)–(c), in which the plots of the control voltages a, b and c, are superimposed. The patterns of applied control voltage a, b and c, are identified in the first sector 80 in FIG. 9. The pattern in the second sector 82, is the mirror of the pattern in the first sector 80, with the pattern repeating indefinitely thereafter.

Applying the principles of the preferred embodiment of the present invention to the SVPWM method it is determined that the following two legs have the longest phase current pulses in each of the sectors, and therefore which should be sampled in that sector:

TABLE 1

| Sector | Inverter legs to be sampled |
|---|---|
| 1 | b, c |
| 2 | a, c |
| 3 | a, c |
| 4 | a, b |
| 5 | a, b |
| 6 | b, c |

In order to find the boundary condition, it is necessary to calculate the shortest interval of motor phase current for the two channels that are sampled and used to construct the third phase current, which happens at time 84 in FIG. 9.

Solving for the range of $T_0$, $T_1$ and $T_2$, the ranges set forth above for any given sector are used to derive:

$$T_0(\text{range}) = 0 \leftrightarrow \frac{T_{PWM}}{4} \quad \text{Equation (17)}$$

$$T_1(\text{range}) = T_{PWM} \frac{2-\sqrt{3}}{8} \leftrightarrow T_{PWM} \frac{2+\sqrt{3}}{8} \quad \text{Equation (18)}$$

$$T_2(\text{range}) = \frac{T_{PWM}}{4} \leftrightarrow \frac{T_{PWM}}{2} \quad \text{Equation (19)}$$

which represent half of the current pulses for the three inverter legs in any given PWM period, respectively.

From Equations (11), (12) and (13) it can be seen that the shortest time for the phase current pulses corresponding to $T_0$ is 0. The voltage across the shunt resistor in the leg corresponding to that pulse is, therefore, not monitored in a given sector. The shortest time for the phase current pulses corresponding to the other two legs is $$2^* T_{PWM} \frac{2-\sqrt{3}}{8},$$

which is $2*0.0335 T_{PWM}$. The multiplicative factor of two derives from the symmetrical nature of the space vector method, which requires that, e.g., $T_1$ be put at the beginning and at the end of $T_{PWM}$. Thus, provided the principles of the preferred embodiment of the present invention are applied in the design of the voltage source inverter, $2*0.0335T_{PWM}$ is the smallest pulse that needs to be monitored in order to obtain an accurate phase current reading for the 3φ VSI to which the method is applied.

Thus, by sampling only the legs identified in Table 1 in the corresponding sectors of each $T_{PWM}$, it is assured that the pulse width for the sample will never be shorter than $2*0.0335T_{PWM}$. The circuit elements are then designed to that limit. Only the shunt voltages for those two legs are monitored, and the motor phase currents for all legs determined in accordance with the principles set forth above. In this way, an accurate phase current for all legs is assured.

Although the present invention and its advantages have been described in detail, it should be understood that various changes, substitutions and alterations can be made herein without departing from the spirit and scope of the invention as defined by the appended claims. For example, while the inventive method is described in detail hereinabove with application to the SVPWM control method, the inventive method may be applied to other three-phase voltage-source inverter control methods, as well, to derive accurate determinations of motor phase current. All such applications of the inventive method are considered within the scope of the invention as set forth in the appended claims.

What is claimed is:

1. In a pulse width modulation controlled three-phase voltage-source inverter having three legs, each leg including two transistors coupled serially between the terminals of a power source and providing a respective drive output, each leg further including a shunt resistor between one of said two transistors, denominated the lower transistor, and one of said terminals, in which control pulses are applied to each leg during a sequence of pulse periods, and said inverter having a neutral current, a method for determining the phase current for each phase, comprising the steps of:

determining which two legs have the longest on time for the lower power transistors during one of said pulse periods;

determining the current through said shunt resistors for said determined legs during said one of said pulse periods to obtain a value representative of the phase current for said legs; and deriving the phase current for the leg not sampled during said one of said pulse periods by subtracting the magnitude of said determined phase currents from the magnitude of said neutral current.

2. A method according to claim 1, wherein said neutral current is zero.

3. In a space vector pulse width modulation controlled three-phase voltage-source inverter having three legs, denominated a, b and c, respectively, each leg including two transistors coupled serially between the terminals of a power source and providing a respective drive output, each leg further including a shunt resistor between one of said two transistors and one of said terminals, in which control pulses are applied to each leg during a sequence of periods, wherein each period has six sectors, and said inverter having a neutral current, a method for determining the phase current for each leg, comprising the steps of:

sampling two of said legs in said sectors according to the schedule:

| sector 1 | legs b and c, |
| sector 2 | legs a and c, |
| sector 3 | legs a and c, |
| sector 4 | legs a and b, |
| sector 5 | legs a and b, |
| sector 6 | legs b and c; | by measuring the voltages across said shunt resistors for said legs;

determining the current through said shunt resistors for said legs that are sampled to obtain a value representative of the phase current for said legs; and deriving the phase current for the leg not sampled during said sector by applying subtracting the magnitude of said determined phase currents from the magnitude of said neutral current.

4. A method according to claim 3, further including the step of providing a three-phase voltage-source inverter having components capable of providing sufficient control voltage to allow a shunt sample pulse width no shorter than $2*0.0335T_{PWM}$.

5. A method according to claim 3, wherein said neutral current is zero.

* * * * *